US012506290B2

(12) United States Patent
Wu et al.

(10) Patent No.: US 12,506,290 B2
(45) Date of Patent: Dec. 23, 2025

(54) ELECTRICAL CONNECTOR WITH IMPROVED TERMINAL MODULES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Xun Wu, Kunshan (CN); Ming-Yi Gong, Kunshan (CN); Tian Yang, Kunshan (CN); Hung-Chi Yu, New Taipei (TW); Wen-Lung Hsu, New Taipei (TW); Min-Hsuan Tsai, New Taipei (TW); Guo-Xiang Niu, Huaian (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 318 days.

(21) Appl. No.: 18/141,435

(22) Filed: Apr. 30, 2023

(65) Prior Publication Data

US 2023/0361497 A1 Nov. 9, 2023

(30) Foreign Application Priority Data

May 5, 2022 (CN) ......................... 202210480472.6

(51) Int. Cl.
*H01R 13/40* (2006.01)
*H01R 12/72* (2011.01)
*H01R 13/652* (2006.01)

(52) U.S. Cl.
CPC ............. *H01R 13/40* (2013.01); *H01R 12/72* (2013.01); *H01R 13/652* (2013.01)

(58) Field of Classification Search
CPC .... H01R 12/716; H01R 12/72; H01R 12/721; H01R 12/737; H01R 13/40; H01R 13/6477; H01R 13/652
See application file for complete search history.

(56) References Cited

U.S. PATENT DOCUMENTS

| | | | | |
|---|---|---|---|---|
| 8,177,564 | B1 | 5/2012 | Ito | |
| 10,381,767 | B1 | 8/2019 | Milbrand, Jr. et al. | |
| 10,777,921 | B2 * | 9/2020 | Lu | H01R 12/716 |
| 11,139,618 | B2 * | 10/2021 | Yang | H01R 13/6474 |
| 11,239,609 | B2 * | 2/2022 | Tang | H01R 13/50 |
| 2012/0225588 | A1 * | 9/2012 | Westman | H05K 1/117 439/636 |

(Continued)

*Primary Examiner* — Zheng Song
(74) *Attorney, Agent, or Firm* — Ming Chieh Chang

(57) ABSTRACT

An electrical connector includes: an insulating housing having a mating face, a card slot recessed from the mating face with a floor face facing the mating face, and two side walls located at opposite sides of the card slot; and two terminal modules retained in the insulating housing, each terminal module including a row of terminals, a conductive plastic, and an insulating plastic, the row of terminals including plural signal terminals and plural grounding terminals, wherein the grounding terminals are partially retained in the conductive plastic and the insulating plastic surrounds and retains the signal terminals and the conductive plastic, thereby forming the terminal module.

14 Claims, 11 Drawing Sheets

(56) References Cited

U.S. PATENT DOCUMENTS

| | | | | |
|---|---|---|---|---|
| 2017/0170606 | A1 | 6/2017 | Phillips et al. | |
| 2019/0067876 | A1* | 2/2019 | Tang | H01R 13/6587 |
| 2019/0173209 | A1* | 6/2019 | Lu | H01R 12/716 |
| 2020/0266584 | A1 | 8/2020 | Lu | |
| 2021/0126402 | A1 | 4/2021 | Zhang et al. | |
| 2021/0135404 | A1 | 5/2021 | Jiang | |
| 2022/0216635 | A1 | 7/2022 | Little et al. | |
| 2023/0187863 | A1* | 6/2023 | Huang | H01R 12/737 439/74 |
| 2023/0187864 | A1* | 6/2023 | Huang | H01R 12/57 439/65 |
| 2023/0208068 | A1* | 6/2023 | Chen | H01R 13/64 439/527 |
| 2024/0413554 | A1* | 12/2024 | Qiu | H01R 13/6466 |

* cited by examiner

ELECTRICAL CONNECTOR WITH IMPROVED TERMINAL MODULES

BACKGROUND OF THE INVENTION

Field of the Invention

The present invention relates generally to an electrical connector with improved terminal modules.

Description of Related Arts

In card edge connectors, the slots for terminals have a large size for assembling of the terminals including signal terminals and grounding terminals, resulting in decrease of dielectric constant around signal terminals. The signal terminals are long and thin, resulting in a large inductive impedance of the signal terminals. US20210126402A1 discloses an insulating inserting member to overcome these problems. But this is not enough in a higher speed connector, such as PCIE 6.0 connector.

An improved electrical connector is desired.

SUMMARY OF THE INVENTION

An object of the present invention is to provide an electrical connector with improved terminal modules.

To achieve the above-mentioned object, an electrical connector comprises: an insulating housing having a mating face, a card slot recessed from the mating face with a floor face facing the mating face, and two side walls located at opposite sides of the card slot; and two terminal modules retained in the insulating housing, each terminal module comprising a row of terminals, a conductive plastic, and an insulating plastic, the row of terminals comprising a plurality of signal terminals and a plurality of grounding terminals, wherein the plurality of grounding terminals are partially retained in the conductive plastic and the insulating plastic surrounds and retains the plurality of signal terminals and the conductive plastic, thereby forming the terminal module.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
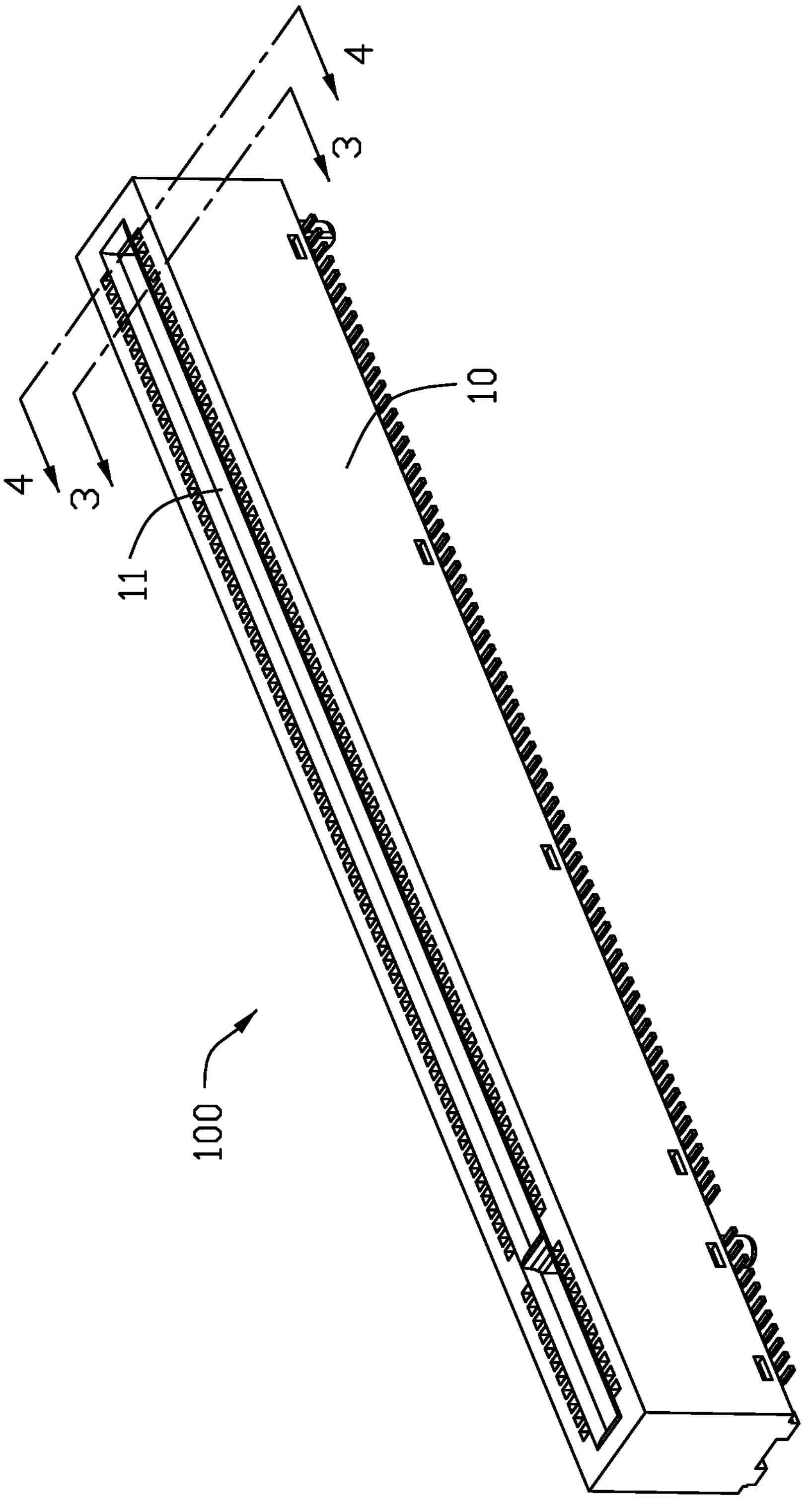
FIG. 1 is a top perspective view of an electrical connector according to an preferred embodiment of the present invention.
Figure 2:
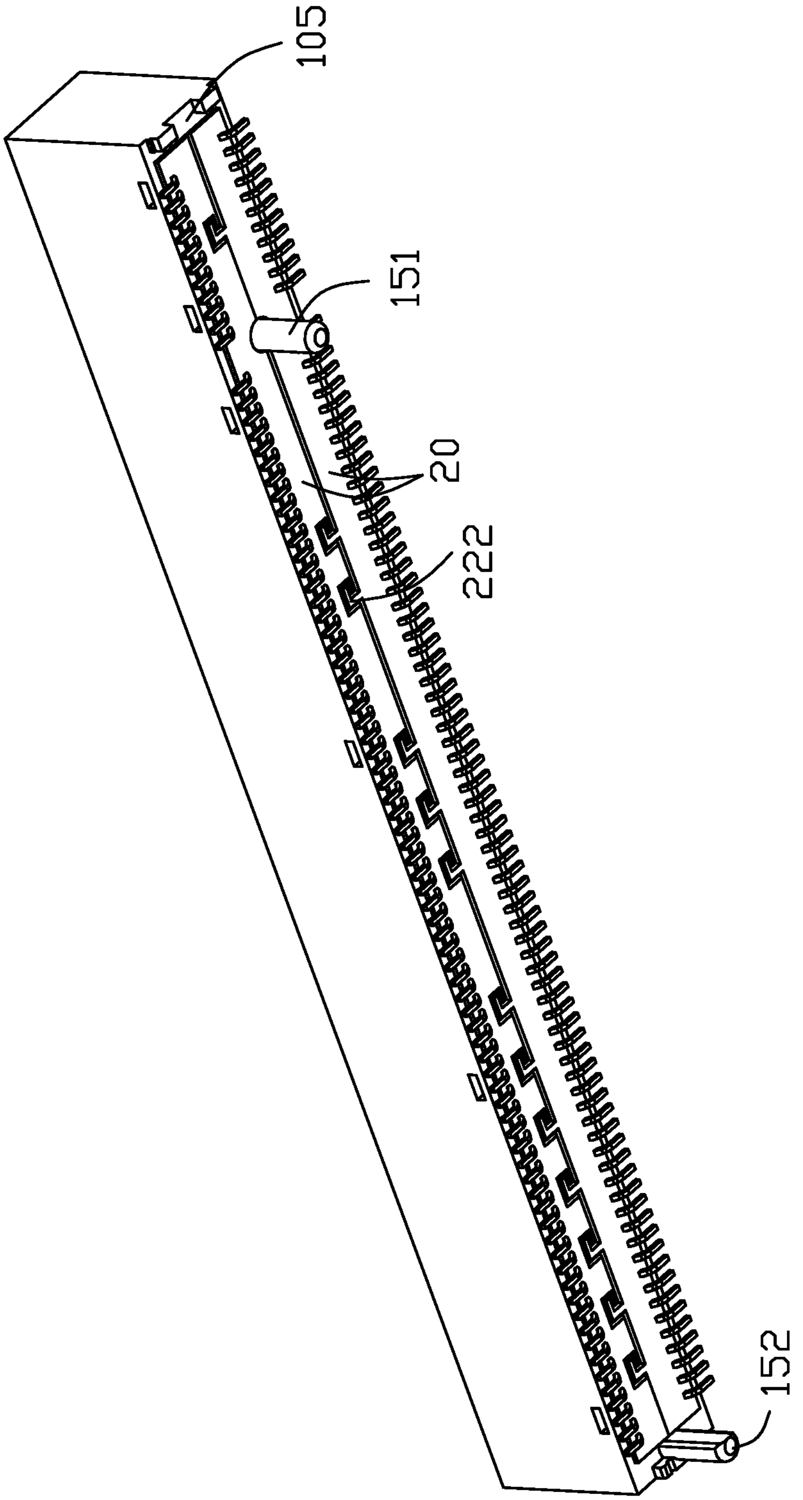
FIG. 2 is a bottom perspective view of the electrical connector in FIG. 1.

Reference will now be made to the drawing figures to describe the preferred embodiment of the present invention in detail.

Referring to FIGS. 1-5, an electrical connector of this invention is a card edge connector 100 used to receive a PCI express module card for higher signal transmission. The card edge connector 100 includes an insulating housing 10 and two terminal modules 20 retained in the housing 10. The insulating housing 10 defines a mating face 101 and a card slot 11 recessed from the mating face 101. The card slot 11 defines a floor face 102 and two inner faces 103 connecting the mating face 101 and the floor face 102. In this embodiment, the top face of the housing is defined as the mating face 101, but not limit to. The card (not shown) is inserted into the card slot 11 through the mating face 101. The housing 10 includes two side walls 12 located at opposite sides of the card slot 11, each side wall 12 defines a plurality of passageways 13 in one row, to receive corresponding terminals 30. The passageways 13 run through a bottom face which is defined as a mounting face 105 of the housing, and through the inner face 103. The passageways 13 run through the mating face 101 in this embodiment. The mounting face 105 defines two mounting posts 151, 152 shaped differently, thereby getting a guidance and an anti-mismate during the card edge connector 100 is mounted on the PCB.

Figure 3:
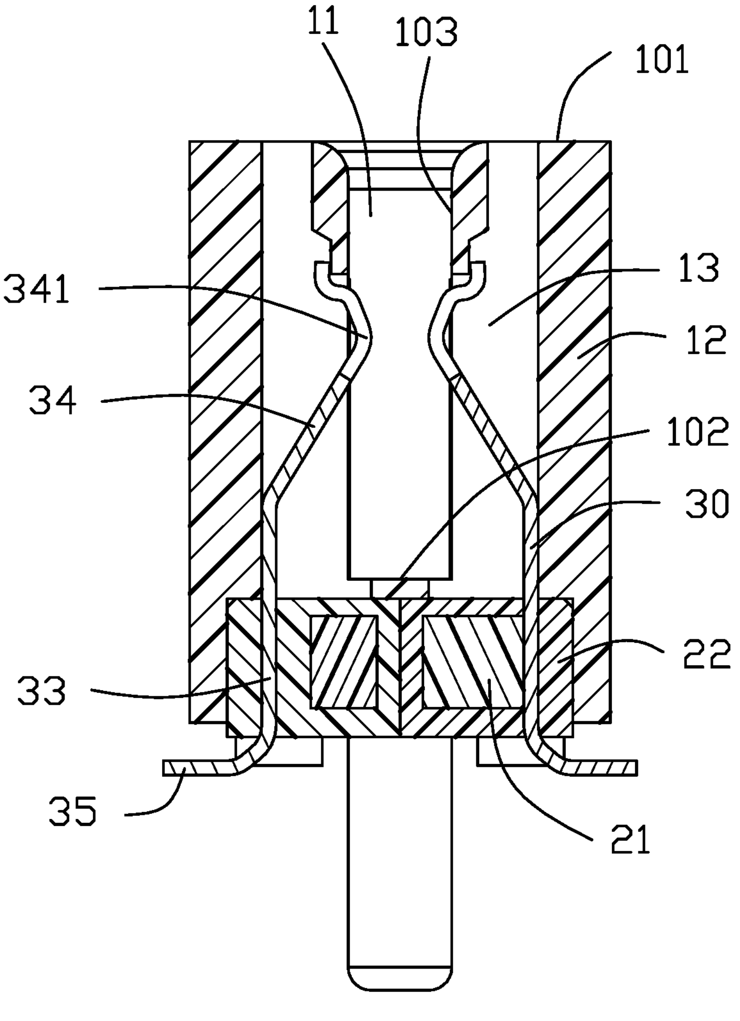
FIG. 3 is a cross-section of the electrical connector taken along lines 3-3 in FIG. 1.
Figure 4:
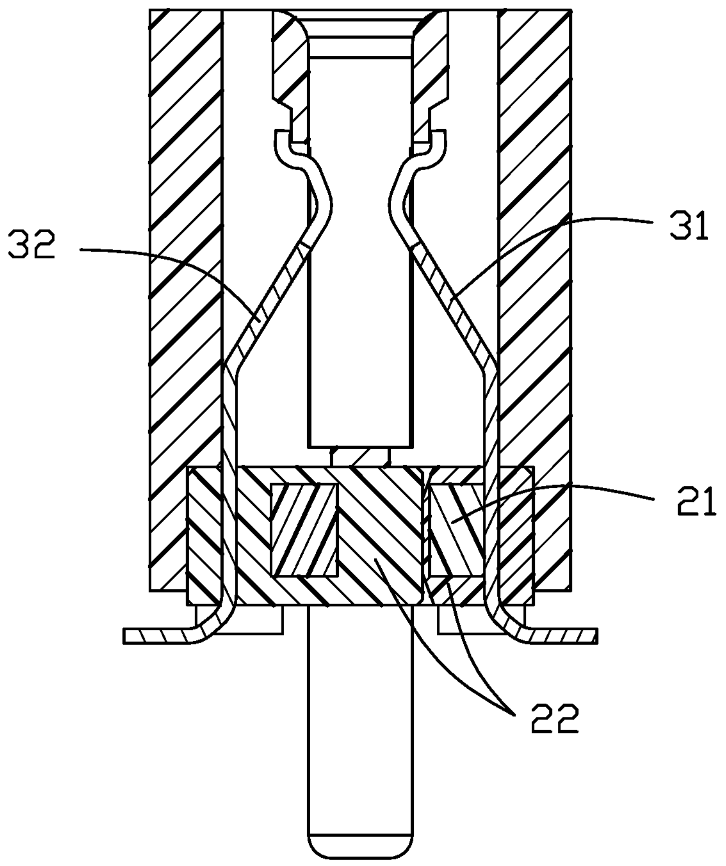
FIG. 4 is a cross-section of the electrical connector taken along lines 4-4 in FIG. 1.
Figure 5:
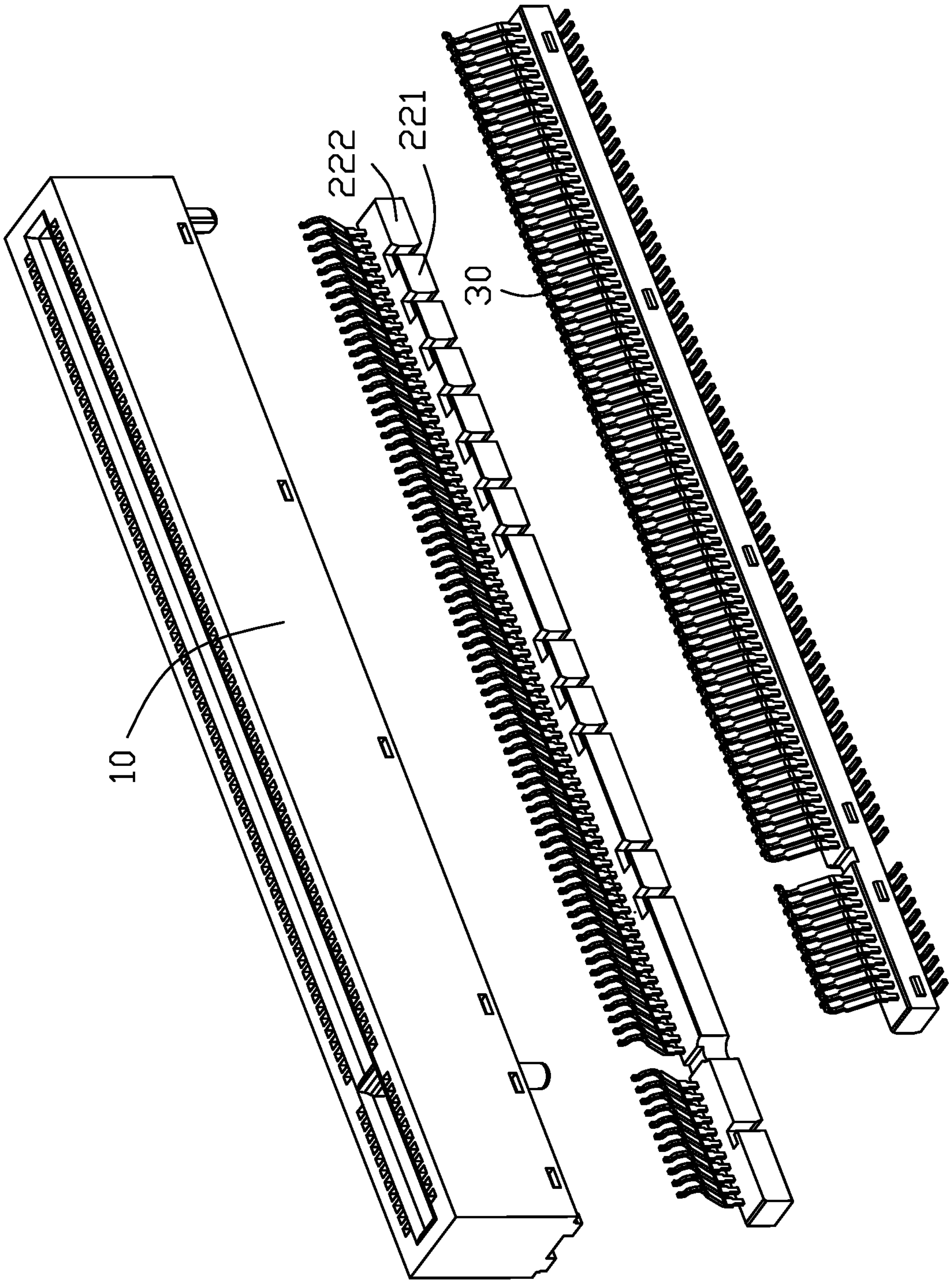
FIG. 5 is an exploded perspective view of the electrical connector in FIG. 1.
Figure 6:
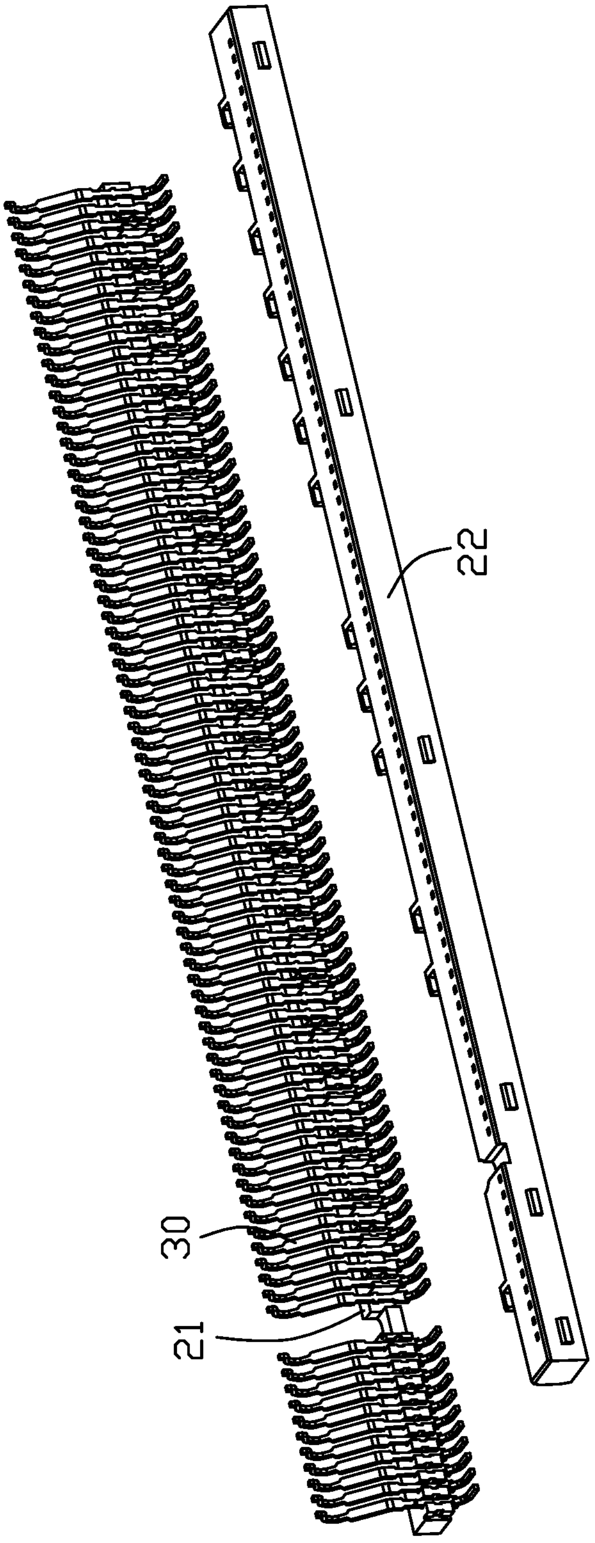
FIG. 6 is an exploded perspective of a terminal module FIG. 5.
Figure 7:
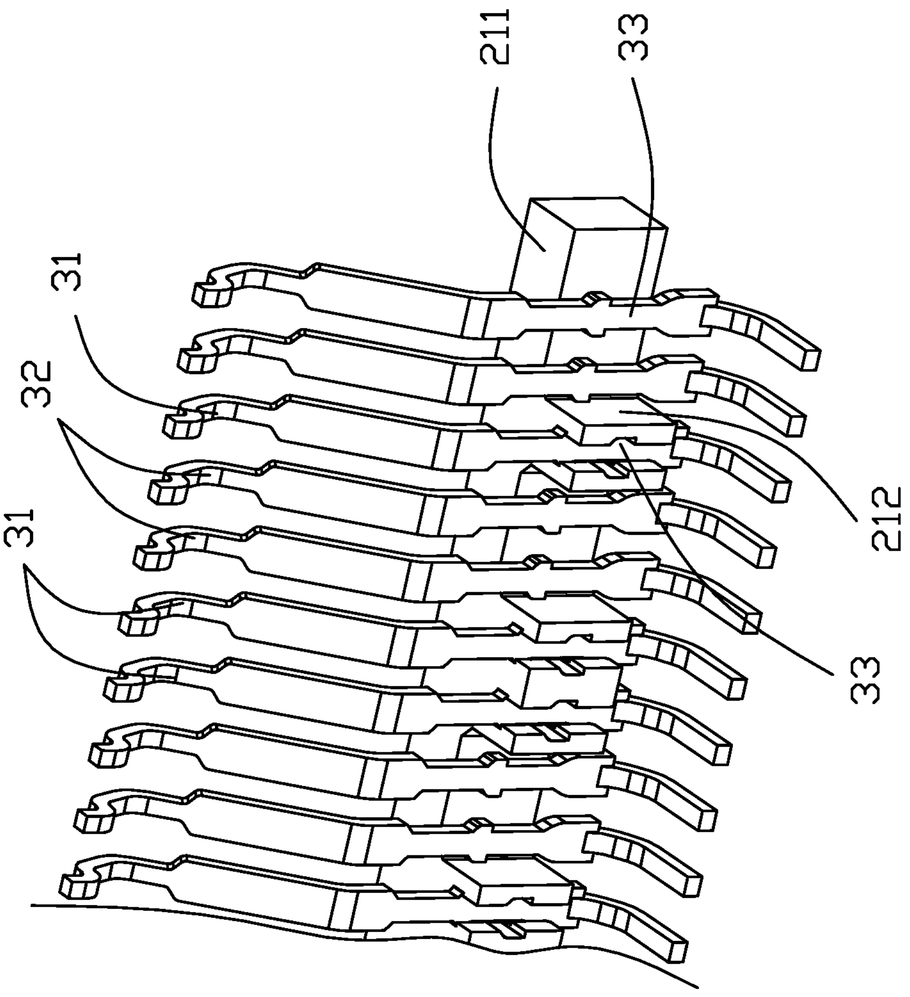
FIG. 7 is a perspective view of the right part of the row of terminals and the conductive plastic in FIG. 6.
Figure 8:
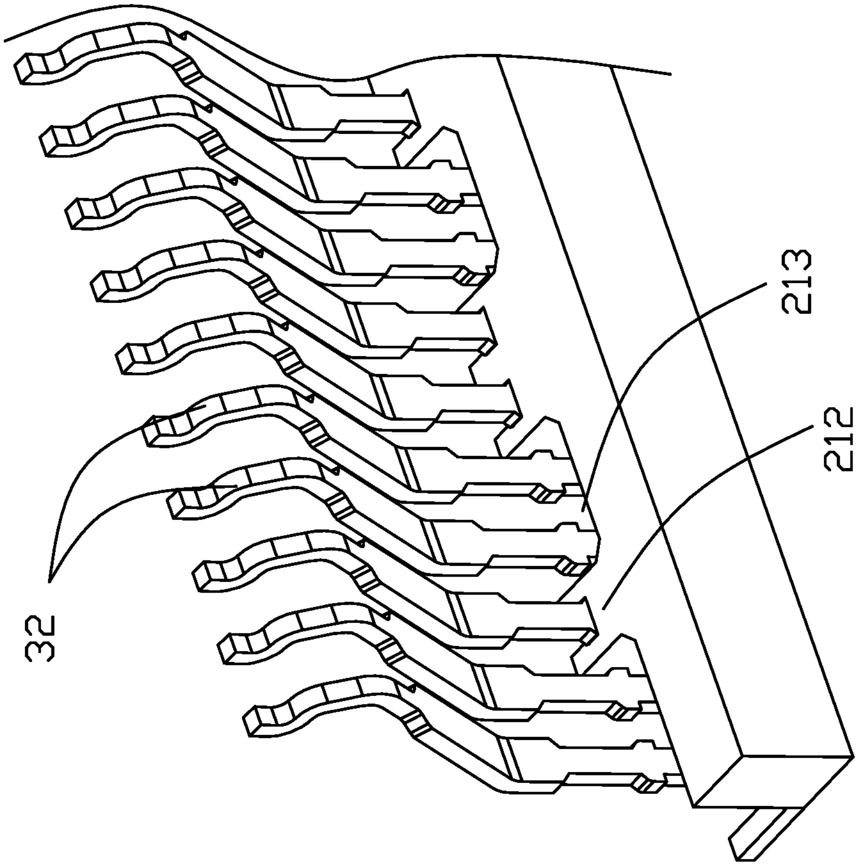
FIG. 8 is another perspective view of the right part of the row of terminals and the conductive plastic in FIG. 7.

Referring to FIGS. 5-8, each terminal module 20 includes a row of terminals 30, a conductive plastic 21 or conductive plastic member and an insulating plastic or an insulating member 22, the row of terminals 30 includes a plurality of grounding terminals 31 and a plurality of signal terminals 32. An improvement of this embodiment is that, the plurality of grounding terminals 32 are partially retained in the conductive plastic 21 and then the insulating plastic 22 is injecting molded around the plurality of signal terminals 32, the plurality the grounding terminals 21 and the conductive plastic 21, to commonly unite together as the terminal module 20 as shown in FIGS. 3-4. The top of the insulating plastic 22 is higher than the top of the conductive plastic 21, the bottom face of the insulating plastic is lower than the bottom face of the conductive plastic 21, the side faces of the insulating plastic 21 are located at the periphery side of the conductive plastic, thereby the insulating plastic 22 wholly surrounding the conductive plastic 21 and further retaining the grounding terminals 31 in the terminal module 20. Referring to FIGS. 3-4, the terminal 30 includes an upright portion 33, an elastic arm 34 slanting from the upright portion 33 and a leg portion 35 bending from the upright portion 33 and out of the bottom face 105 of the insulating plastic 22, the elastic arm 34 protrudes into the card slot 11 through the inner face 103 and define a contacting portion 341. The upright portion 33 of the signal terminal 32 is embedded in the insulating plastic 22. Most of the upright portion 33 of the grounding terminal 32 is embedded in the conductive plastic 22 and a small part of the upright portion 33 of the grounding terminal 32 is embedded in the insulating plastic 22, that is, the upright portion 33 of the grounding terminal is embedded in the insulating plastic 22 and the conductive plastic 21.

Figure 9:
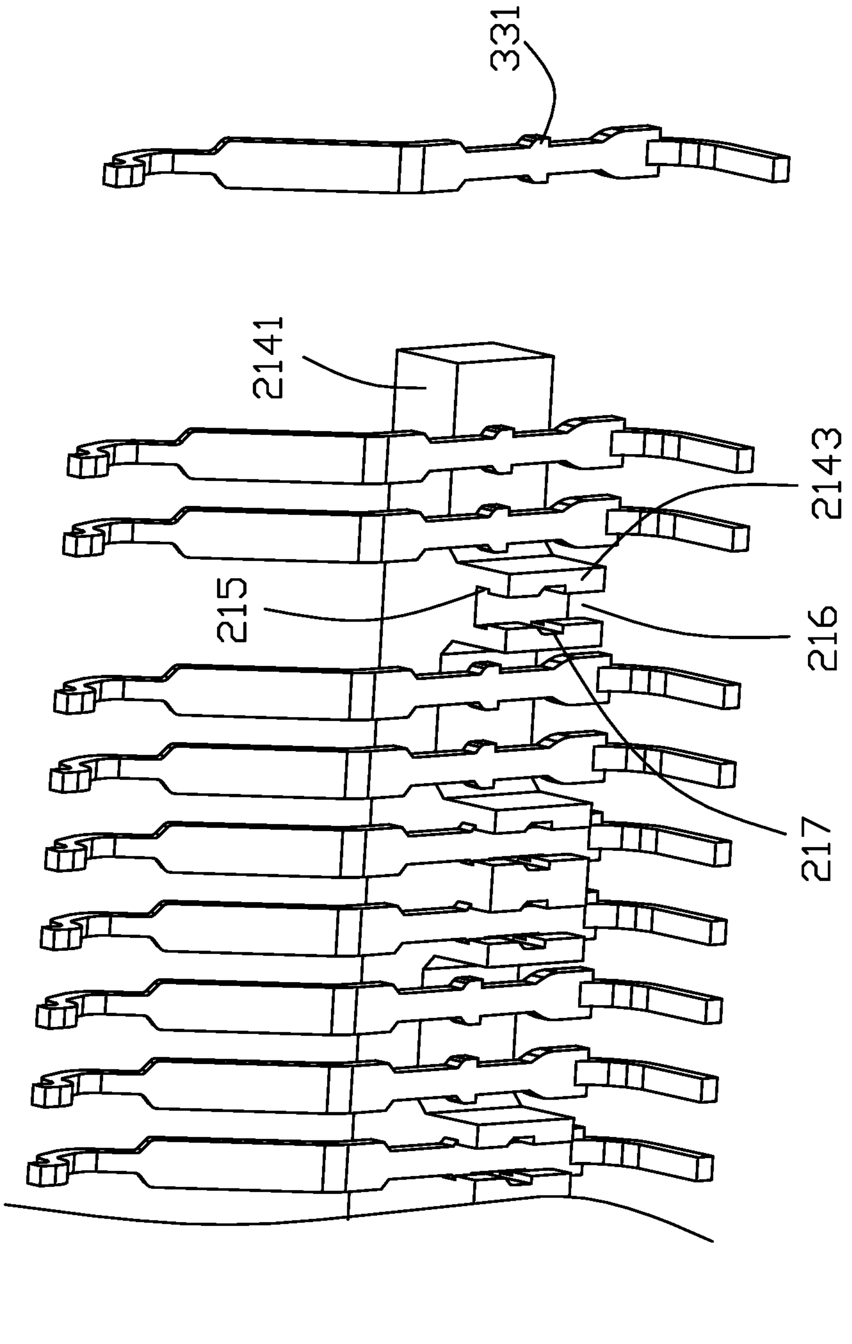
FIG. 9 is similar to FIG. 7, one grounding terminal is disassembled from the conductive plastic.
Figure 10:
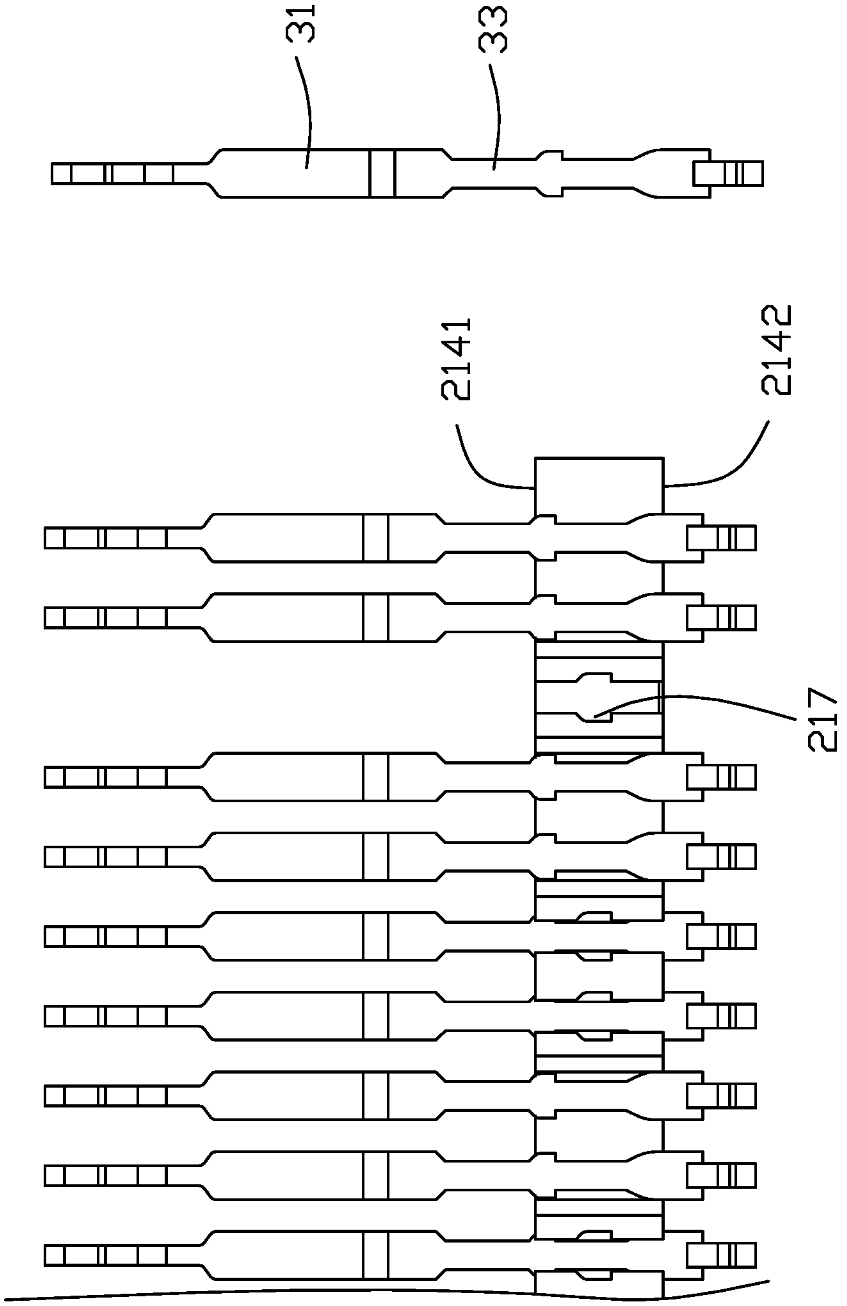
FIG. 10 is a front elevational view of the right part of the row of terminals and the conductive plastic in FIG. 9.
Figure 11:
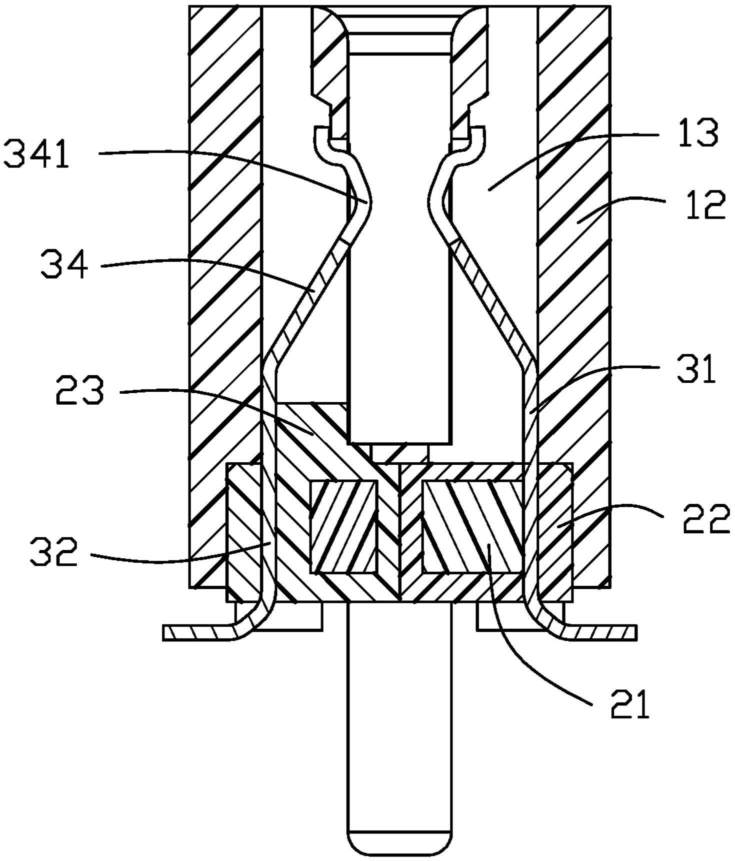
FIG. 11 is similar to FIG. 3, showing an alternative embodiment of the insulating member.

Referring to FIGS. 6-10, an assembling process of the conductive plastic 21 and the row of terminals 30 is shown hereinafter. The conductive plastic 21 includes a longitudinal base 211 located at one side of the terminals 30 and a plurality of protruding portions 212 extending from the longitudinal base 211 toward the terminals 30. The upright portions 33 of the grounding terminals 31 are retained in the protruding portions 211 one by one, a vacant portion 213 is reminded between two adjacent protruding portions 212 and the signal terminals 32 go across the vacant portions 213. In this embodiment, two adjacent signal terminals 32 are defined as a differential pair and two differential pairs are separated with two grounding terminals 31. Referring to FIGS. 9-10, the conductive plastic member 21 defines opposite first face 2141 and second face 2142 and third face 2143 connecting with the first face and the second face, retaining slots 215 and receiving slots 216 through the first and second face 2141, 2142. The upright portions 33 of the grounding terminals 31 are retained in the retaining slots 215, the receiving slot 216 communicates with the retaining slot 215 and run through the third face 2143. The middle portion of the upright portion becomes smaller in longitudinal direction of the housing to form a narrow portion, and defines retaining tabs 331. The retaining tabs 331 protrude from opposite lateral sides of the narrow portion. The row of terminals 30 is arranged in a line and connects with a strip. The upright portions of the row of the terminals go across the receiving slots 216 until the retaining tabs 331 go across the widening notch 217 and enter into the retaining slots 216. Then the row of the terminals 30 moves upwards or downwards until the upright portions 33 are interfered with the retaining slot 215. The signal terminals 32 in the vacant portions 213 are prevented from being influenced by the conductive plastic 21. The insulating plastic 22 is injection-molded around the conductive plastic and the grounding terminals and signal terminals, thereby obtaining the terminal module 20. The insulating plastic 22 can be further protrudes upwards as shown in FIG. 11, to change the dielectric constant around signal terminals.

The insulating plastics 22 of the two terminal modules define assembling face 221 with L-shape assembling ribs 222 to assembly the two terminal modules together in an upper-lower direction. The insulating plastics 22 are inserted in the housing 10 from the mounting face 105. The grounding terminals connect with each other by the conductive plastic 21, resulting in shorting grounding patch and shift the resonance to a higher range. The insulating plastic 22 surrounding the signal terminals 32, the grounding terminals 31 and the conductive plastic 21 increases the strength of the terminal module 20 and decreases the risk of the conductive plastic 21 influence the signal terminals 32.

The making process of the electrical connector 100 is described hereinafter. Step 1, a row of terminals 30 is provide, the row of terminals includes grounding terminals and signal terminals, the terminals includes the upright portion with retaining tabs. Step 2, a conductive plastic is provided, the conductive plastic is assembled with the row of terminals, the upright portions of the grounding terminals are retaining in the conductive plastic. Step 3, the insulating plastic is formed, the insulating plastic surrounds and retains the upright portions of the signal terminals and the grounding terminals and the conductive plastic by an injection-mold process. Step 4, the two terminal modules are assembled together and inserted into the insulating housing 10 from the bottom face of the housing.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

an insulating housing having a mating face, a card slot recessed from the mating face with a floor face facing the mating face, and two side walls located at opposite sides of the card slot; and two terminal modules retained in the insulating housing, each terminal module comprising a row of terminals, a conductive plastic, and an insulating plastic, the row of terminals comprising a plurality of signal terminals and a plurality of grounding terminals;

wherein the plurality of grounding terminals are partially retained in the conductive plastic and the insulating plastic surrounds and retains the plurality of signal terminals and the conductive plastic; and the conductive plastic is wholly surrounded within the insulating plastic.

2. The electrical connector as claimed in claim 1, wherein each of the side walls defines a plurality of passageways, the terminal comprises an upright portion and an elastic arm, the elastic arm extends across the passageways with a contacting portion in the card slot, and the upright portion is embedded in the insulating plastic or the conductive plastic.

3. The electrical connector as claimed in claim 2, wherein the conductive plastic has opposite first face and second face and a third face connecting with the first and second faces and defines a plurality of retaining slots running through the first face and the second face and a plurality of receiving slots adjacent to corresponding retaining slots and going through the third faces, and the upright portions of the grounding terminals are correspondingly retained in the retaining slots.

4. The electrical connector as claimed in claim 3, wherein the upright portion defines retaining tabs at opposite edges thereof, the receiving slot defines a notch wider than the retaining tabs, the retaining tabs of each upright portion go into the retaining slot from the receiving slot in a direction perpendicular to the side wall across the notch and then move in a direction perpendicular to the mating facer until retaining in the retaining slots.

5. The electrical connector as claimed in claim 2, wherein the conductive plastic comprises a longitudinal base and a plurality of protruding portions extending from the longitudinal base toward the row of the terminals, the upright portions of the grounding terminals are retained in the protruding portions, and the signal terminals are located in vacant portions between adjacent protruding portions.

6. The electrical connector as claimed in claim 1, wherein the insulating plastic of each terminal module has an assembling face and a plurality of L-shaped assembling portions, and the assembling portions of the two terminal modules are retained together after the two terminal modules are assembled in an upright direction.

7. An electrical connector comprising:

a terminal module comprising a row of terminals, a conductive plastic member, and an insulating member, the row of terminals comprising a plurality of signal terminals and a plurality of grounding terminals, each terminal comprising an upright portion with retaining tabs at opposite sides thereof;

a conductive plastic member assembled to the plurality of grounding terminals to retain the upright portions of the plurality of grounding terminals; and an insulating plastic member surrounds and retains the plurality of signal terminals and the conductive plastic member; wherein the conductive plastic member has opposite first face and second face and a third face connecting with the first and second faces and defines a plurality of retaining slots running through the first face and the second face and receiving slots adjacent to corresponding retaining slots and through the third faces, and the upright portions of the grounding terminals are retained in the retaining slots; and the receiving slot defines a notch wider than the retaining tabs, and the retaining tabs of each upright portion go into the retaining slot from the receiving slot in a direction perpendicular to the side wall across the notch and then go in an up and down direction.

8. The electrical connector as claimed in claim 7, wherein the insulating plastic member wholly surrounds the conductive plastic member.

9. The electrical connector as claimed in claim 7, wherein the conductive plastic member comprises a longitudinal base and a plurality of protruding portions extending from the longitudinal base toward the row of the terminals, the upright portions of the grounding terminals are retained in the protruding portions, and the signal terminals are located in vacant portions between adjacent protruding portions.

10. An electrical connector comprising:

an insulating housing having a mating face, a card slot recessed from the mating face, and a plurality of terminal passageways;

a row of terminals received in corresponding terminal passageways and comprising a plurality of signal terminals and a plurality of grounding terminals, each of the row of terminals comprising an upright portion and an elastic arm slantwise extending from the upright portion with a contacting portion protruding into the card slot;

an insulating member assembled in the insulating housing and protruding into corresponding passageways and below the elastic arms of corresponding signal terminals; and a conductive plastic member embedded in the insulating member and electrically connecting the plurality of grounding terminals; wherein the upright portions of the plurality of grounding terminals are retained in the conductive plastic member and the insulating member surrounds and retains the upright portions of the plurality of signal terminals and the conductive plastic member.

11. The electrical connector as claimed in claim 10, wherein the insulating member further surrounds the upright portions of the plurality of grounding terminals.

12. The electrical connector as claimed in claim 10, wherein the conductive plastic member comprises a longitudinal base and a plurality of protruding portions extending from a lateral side of the longitudinal base, and the upright portions of the grounding terminals are retained in corresponding protruding portions.

13. An electrical connector comprising:

an insulating housing having a mating face, a card slot recessed from the mating face, and a plurality of terminal passageways;

a row of terminals received in corresponding terminal passageways and comprising a plurality of signal terminals and a plurality of grounding terminals, each of the row of terminals comprising an upright portion and an elastic arm slantwise extending from the upright portion with a contacting portion protruding into the card slot;

an insulating member assembled in the insulating housing and protruding into corresponding passageways and below the elastic arms of corresponding signal terminals; and a conductive plastic member embedded in the insulating member and electrically connecting the plurality of grounding terminals; wherein the insulating member further surrounds the upright portions of the plurality of grounding terminals.

14. An electrical connector comprising:

an insulating housing having a mating face, a card slot recessed from the mating face, and a plurality of terminal passageways;

a row of terminals received in corresponding terminal passageways and comprising a plurality of signal terminals and a plurality of grounding terminals, each of the row of terminals comprising an upright portion and an elastic arm slantwise extending from the upright portion with a contacting portion protruding into the card slot;

an insulating member assembled in the insulating housing and protruding into corresponding passageways and below the elastic arms of corresponding signal terminals; and a conductive plastic member embedded in the insulating member and electrically connecting the plurality of grounding terminals; wherein the conductive plastic member comprises a longitudinal base and a plurality of protruding portions extending from a lateral side of the longitudinal base, and the upright portions of the grounding terminals are retained in corresponding protruding portions.

* * * * *